United States Patent Office 3,462,469
Patented Aug. 19, 1969

3,462,469
REACTION PRODUCTS OF CHLORIDES OF Mo(V), Nb(V), Ta(V) and W(VI) WITH BORATE ESTERS
Robert C. Wade, Ipswich, Mass., assignor to Ventro Corporation, Beverly, Mass., a corporation of Massachusetts
No Drawing. Original application Sept. 25, 1967, Ser. No. 670,419. Divided and this application Sept. 25, 1967, Ser. No. 670,449
Int. Cl. C07f *11/00, 9/00, 5/02*
U.S. Cl. 260—429
14 Claims

ABSTRACT OF THE DISCLOSURE

Products made by reacting chlorides of metals selected from Mo(V), Nb(V), Ta(V), and W(VI) with borate esters such as trimethyl borate, triethyl borate, tripropyl borate, tributyl borate, trihexyl borate, trihexylene glycol biborate, and tri(m,p)cresyl borate in a molar ratio of at least about 0.33 mole of the selected borate ester for each mole of the chloride of the selected metal in a diluent, such as the selected borate ester, methylene chloride, chloroform, and carbon tetrachloride, at a temperature between room temperature and about 200° C. until the reaction mixture ceases to give off organic chloride thereby forming a liquor comprising the diluent and a compound of complex chemical structure comprising the selected metal, boron, carbon, hydrogen, chlorine, and oxygen. The complex compound is isolated by removing volatile material from the reaction mixture by evaporation. The complex compounds are useful for coating glass surfaces, as polymerization catalysts and as chemical intermediates.

This invention relates to products of unknown complex chemical structure prepared by reacting the chloride of a metal selected from Mo(V), Nb(V), Ta(V), and W(VI) with borate esters and is a division of my copending application Ser. No. 670,419, filed Sept. 25, 1967.

The above mentioned copending application discloses the preparation of highly useful products of complex chemical structure which are the reaction products of trimethyl borate with the chloride of a metal selected from the group consisting of Ti(IV), Zr(IV), Hf((IV), Al(III), Fe(III), Cu(I), Mo(V), Nb(V), Sn(IV), Si(IV), Ta(V), W(VI) and mixtures of such chlorides. While it is preferred to employ trimethyl borate, it may be replaced by other borate esters, such as triethyl borate, tripropyl borate, tributyl borate, trihexyl borate, trihexylene glycol biborate, tri(m,p)cresyl borate, and mixtures thereof or a mixture of one or more of such borate esters with trimethyl borate.

In forming these products of unknown complex chemical structure using trimethyl borate, the substantially anhydrous chloride of the selected metal is mixed with substantially anhydrous trimethyl borate in a molar ratio of at least about 0.33 mole of borate ester for each mole of the chloride of the selected metal, preferably, in a substantially anhydrous inert diluent, such as methylene chloride, chloroform, carbon tetrachloride, or an excess of trimethyl borate. The reactions may be carried out between room temperature and about 120° C. The order of addition of the reagents is not critical. Thus, the metal chloride may be added to the boron ester, or the boron ester may be added to the metal chloride, or both may be added simultaneously to the reaction zone.

In the case of the very reactive combinations of reagents, such as titanium tetrachloride or ferric trichloride with trimethyl borate, the reactions start immediately at room temperature and the temperature of the reaction mixture rises slightly with methyl chloride being given off. In the case of less reactive combinations of reagents, it is often necessary to heat the reagents mildly, for example, to the boiling point of methylene chloride (40.1° C.) or trimethyl borate (67°–68° C.), or in a few cases to temperatures as high as 90°–120° C. In the case of silicon tetrachloride the reaction is very slow but the rate of reaction may be accelerated by the addition of a minor amount of more reactive metal chloride as a promoter, such as ferric chloride or titanium tetrachloride, etc.

When methyl chloride ceases to be given off the reaction is complete and the desired reaction product may be isolated by evaporation of volatile material, such as the diluent or excess reagent. This may be accomplished by applying a vacuum to the reaction vessel while gently heating. In some cases, the reaction product is highly soluble in the reaction medium, therefore, stronger heating under vacuum is required to remove the volatile material. In general, temperatures not over 100° C. under a final vacuum of 1–20 mm. of mercury are sufficient to remove the volatile material. Most of the reaction products appear to be polymeric in nature and very complex in chemical structure.

When reacting a mixture of chlorides of selected metals with a borate ester, at least about 0.33 mole of the selected borate is used for each sum of the molar proportions of the chlorides of the selected metals.

When producing a complex product produced by the reaction of the chlorides of at least two selected metals with trimethyl borate, it is often preferable to react one of the metal chlorides with the borate completely as previously described but without isolating the complex reaction product. The chloride of another selected metal, in a molar quantity not greater than the molar quantity of the chloride of the first selected metal, then may be added to the reaction liquor and be reacted with the previously formed complex reaction product at a temperature between room temperature and about 120° C. After the second reaction has been completed, as indicated when methyl chloride ceases to be given off, volatile material is removed by evaporation to isolate the second complex reaction product. This method is particularly advantageous when it is desired to react a very reactive metal chloride, such as titanium tetrachloride or ferric chloride, and a less reactive metal chloride, such as SiCl₄, with trimethyl borate.

The method for reacting the chlorides of the previously mentioned group of metals with other borate esters, such as triethyl borate, tripropyl borate, tributyl borate, trihexyl borate, trihexylene glycol biborate, tri(m,p)cresyl borate, and mixtures thereof or a mixture of one or more of such borates with trimethyl borate is similar to that described for the reaction with trimethyl borate. With these borate esters, however, the reactions are, in general, considerably slower and temperatures up to about 200° C. may be used to obtain reasonable reaction rates. Since the boiling points of the organic chloride by-products are considerably higher than methyl chloride, they must be distilled or evaporated from the reaction product by heating the reaction mixture either at atmospheric or reduced pressure.

The complex reaction product of molybdenum pentachloride and trimethyl borate is soluble in water, is substantive in glass and cellulosic surfaces, and when applied to these materials in the form of an aqueous solution and dried followed by application of a soap solution develops excellent water repellant finishes. This product also is reactive at room temperature with aromatic and olefinic hydrocarbons to form highly colored complexes. With methylated benzene compounds, such as toluene and xylene, intense blue or greenish blue pigments are formed. With benzene a deep yellow brown colored precipitate is formed; with chlorobenzene a muddy brown colored precipitate forms; and with styrene a brown colored precipitate forms. Warming styrene gently with a small amount of this complex reaction product causes vigorous polymerization of the styrene. Warming this complex product with perchloroethylene slowly develops a blue green color. Warming it with heptene forms a dark yellow brown colored precipitate. Thus, this reaction product can be used as a sensitive spot test for unsaturated and aromatic hydrocarbons and is especially useful to detect methylated aromatic hydrocarbons. This reaction product also is a strong Friedel Crafts catalyst.

The complex reaction products of niobium pentachloride and trimethyl borate and of tantalum pentachloride with trimethyl borate are not appreciably soluble in water but are slightly soluble in dilute (2%) aqueous sodium hydroxide solutions. These alkaline solutions may be used to coat glass surfaces, and when followed by treatment with an aqueous soap solution, water repellancy is imported to the glass surface. The tantalum reaction product fluoresces a bright peach color under "black light" ultraviolet radiation. Thus, the latter product is useful in decorative compositions of plastics and paints to produce this peach color in "black light."

The complex product obtained from the reaction of $WCl_6$ and trimethyl borate is photochromic, being a deep blue when exposed to visible light and yellowish white in the dark. It is also an active catalyst for polymerizing monomers, such as styrene.

The complex products prepared with trimethyl borate still contain unreacted chlorine atoms. The halogens are still reactive toward many organic groups which contain a reactive hydrogen atoms, such as amino, hydroxyl, or carboxyl groups. The reaction products of $TiCl_4$, $ZrCl_4$, $SiCl_4$, $FeCl_3$, $TaCl_5$, $NbCl_5$, and $SnCl_4$ with trimethyl borate in particular react vigorously with alkyl or aryl amines; with polyamines; with alcohols; and with carboxylic acids and their salts to produce derivative of enhanced properties for a wide variety of applications. Thus, these complex products may be reacted, for example, with lauryl amine to give new products which have high surface activity in water and which contain both the parent metal atom and boron.

The complex reaction products prepared by reacting the chlorides of the group of metals previously mentioned with borate esters, such as triethyl borate, tripropyl borate, tributyl borate, trihexyl borate, trihexylene glycol biborate, and tri(m, p)cresyl borate also contain unreacted chlorine atoms. These halogens are still reactive toward many organic groups which contain a reactive hydrogen atom and react therewith similar to the reaction products made with trimethyl borate. In general, the properties of these complex reaction products are similar to those prepared with corresponding metal chlorides and trimethyl borate.

The compositions of the complex reaction products of the borate esters appears to vary with the molar ratios of borate ester to metal chloride as indicated by the amount of by-product organic chloride given off. The properties of the complex reaction products described herein are the properties possessed by products obtained by reacting the metal chlorides with the maximum amounts of borate esters which in turn varies with the metal chloride and borate ester used.

In addition to the inert diluents previously mentioned these complex reactions may also be carried out in aliphatic hydrocarbons, such as petroleum ether, hexane, heptane, octane, and cyclohexane. However, the reactions proceed much more slowly in these diluents and, therefore, are not preferred.

The invention is illustrated further by the following specific examples.

Example 1

The equipment used in this experiment comprised a stirred reaction flask which was fitted with an additional funnel, thermometer and reflux condenser. The reflux condenser in turn was connected to an empty safety trap, then to a water scrubber and then to a gas meter. 91 grams (0.33 mole) of anhydrous $MoCl_5$ was suspended in 200 grams of methylene chloride in the reaction flask. 104 grams of trimethyl borate (1 mole) was added to the suspension at a controlled rate at room temperature. The temperature rose from 23° C. to about 31° C. The reaction was completed by heating the reaction mixture to about 40° C. until about 0.67 mole of $CH_3Cl$ had been given off. The product was recovered by evaporating off the methylene chloride and unreacted methyl borate. There was recovered 120 grams of reddish-brown solids which were easily soluble in water. The solids softened and melted between 60°–70° C. About two moles of trimethyl borate reacts with one mole of $MoCl_5$.

Elemental analysis of the product showed Mo, 26.1%; Cl, 21.5%; B, 5.8%; C, 15.8%; H, 2.9%; and O (by difference), 27.9%.

Example 2

The equipment used in this experiment was the same as that used in Example 1. 67.5 grams (0.25 mole) of anhydrous $NbCl_5$ dissolved and suspended in 200 grams of methylene chloride was reacted with 104 grams (1 mole) of trimethyl borate. The reaction was very exothermic and about 0.75 mole of methyl chloride was given off. The final product was very soluble in the methylene chloride and appeared to be polymeric. Final recovery was 82 grams of tannish white solids.

Elemental analysis of the product showed Nb, 29.0%; Cl, 16.8%; B, 6.5%; C, 14.7%; H, 3.0%; and O (by difference), 30.0%.

Example 3

The equipment used in Example 1, 90 grams of anhydrous $TaCl_5$ (0.25 mole) was reacted with 104 grams (1 mole) of trimethyl borate. The reaction was exothermic and methyl chloride came off instantly upon the addition of methyl borate. Slightly less than 0.75 mole of $CH_3Cl$ was given off and measured during the reaction. 113 grams of light tan-colored solids were recovered.

Elemental analysis of the product showed Ta, 46.4%; Cl, 14.7%; B, 4.9%; C, 11.2%; H, 2.3%; and O (by difference), 20.5%.

Example 4

The reaction of 100 grams (0.25 mole) of anhydrous $WCl_6$ suspended in 200 grams of methylene chloride with 104 grams (1 mole) of trimethyl borate was carried out in equipment the same as that used in Example 1. The reaction was vigorous. The original dark-red suspension of finely divided solids became very curdy and changed in color to orange and then yellow as the reaction progressed. The completely reacted solids were a light-greenish yellow in color. Slightly less than 1 mole of $CH_3Cl$ came off during the reaction. The final dried product was a very light blue powder which weighed 106.5 grams. These solids were less than 1% soluble in water. Upon standing in a closed glass jar the color on the top surface and around glass surfaces became an intense blue color. Powder in the interior of the mass was a light yellow color. When the powder was stored in the dark, the intense blue color faded and changed more toward the yellow color indicating that this material is photochromic. When re-exposed to sunlight the intense blue color reappeared.

Elemental analysis of the product showed W, 37.5%; Cl, 16.5%; B, 53.%; C, 10.1%; H, 212%; and O (by difference), 29.4%.

In similar experiments, triethyl borate, tripropyl borate, tributyl borate, trihexyl borate, trihexylene glycol biborate, and tri(m,p)cresyl borate were reacted with $AlCl_3$, $ZrCl_4$, $HfCl_4$, $FeCl_3$, $SnCl_4$, $MoCl_5$, $TaCl_5$, $NbCl_5$, $WCl_6$ and $Cu_2Cl_2$.

In my copending application Ser. No. 670,419, filed Sept. 25, 1967 I have claimed methods for producing compounds of unknown complex chemical structure by reacting borate ester selected from the group consisting of trimethyl borate, triethyl borate, tripropyl borate, tributyl borate, trihexyl borate, trihexylene glycol biborate and tri(m,p)cresyl borate and a chloride of a metal selected from the group consisting of Ti(IV), Zr(IVD), Hf(IV), Sn(IV), and Si(IV) together with the complex compounds formed thereby.

In my copending application Ser. No. 670,450, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a metal selected from the group consisting of Al(III), Fe(III), and Cu(I) together with the complex compounds formed thereby.

In my copending application Ser. No. 670,418, filed Sept. 25, 1967. I have claimed methods for producing compounds of unknown complex chemical structure by reacting borate esters selected from the group consisting of trimethyl borate, triethyl borate, tripropyl borate, tributyl borate, trihexyl borate, tripropyl borate, tributyl borate, trihexyl borate, trihexylene glycol biborate, and tri(m,p)cresyl borate with a mixture of at least two chlorides of metals selected from the group consisting of Ti(IV), Zr(IV), Hf(IV), Sn(VI), Si(IV), Al(III), Fe (III), Cu(I), Mo(V), Nb(V), Ta(V), and W(VI) together with the complex compounds formed thereby.

In my copending application Ser. No. 670,417, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a first metal selected from the group consisting of Ti(IV), Zr(IV), Hf(IV), Sn(IV), Si(IV), Al(III), Fe(III), Cu(I), Mo (V), Nb(V), Ta(V), and W(VI) in an inert diluent to form a liquor comprising the diluent and a first compound of complex chemical structure and then adding to the liquor the chloride of a second metal selected from said group and permitting it to react with said compound of complex chemical structure to form a second compound of complex chemical structure comprising both of the selected metals, boron, carbon, hydrogen, chlorine, and oxygen.

I claim:

1. The method which comprises mixing at least one substantially anhydrous borate ester selected from the group consisting of trimethyl borate, triethyl borate, tripropyl borate, tributyl borate, trihexyl borate, trihexylene glycol biborate, and tri(m,p)cresyl borate with a subtantially anhydrous chloride of a metal selected from the group consisting of Mo(V), Nb(V), Ta(V), and W(VI) in a molar ratio of at least 0.33 mole of the selected borate for each mole of the chloride of the selected metal in an inert substantially anhydrous diluent, permitting the chloride of the selected metal to react with the selected borate at a temperature between room temperature and about 200° C. until the reaction mixture ceases to give ofl organic chloride thereby forming a liquor comprising said diluent and a compound of complex chemical structure comprising the selected metal, boron, carbon, hydrogen, chlorine, and oxygen.

2. The method as claimed by claim 1 wherein said diluent is selected from the group consisting of the selected borate, methylene chloride, chloroform, and carbon tetrachloride.

3. A compound of complex chemical structure produced by the method claimed by claim 1.

4. The method which comprises mixing substantially anhydrous trimethyl borate with a substantially anhydrous chloride of a metal selected from the group consisting of Mo(V), Nb(V), Ta(V), and W(VI) in a molar ratio of at least about 0.33 mole of said borate for each mole of the chloride of the selected metal in a substantially anhydrous diluent, permitting the chloride of the selected metal to react with said borate at a temperature between room temperature and about 120° C. until the reaction mixture ceases to give off methyl chloride thereby forming a liquor comprising said diluent and a compound of complex chemical structure comprising the selected metal, boron, carbon, hydrogen, chlorine, and oxygen.

5. The method as claimed by claim 4 wherein said diluent is selected from the group consisting of said borate, methylene chloride, chloroform, and carbon tetrachloride.

6. A compound of complex chemical structure produced by the method claimed by claim 4.

7. The method claimed by claim 4 wherein the chloride of the selected metal is molybdenum pentachloride.

8. The method claimed by claim 4 wherein the chloride of the selected metal is niobium pentachloride.

9. The method claimed by claim 4 wherein the chloride of the selected metal is tantalum pentachloride.

10. The method claimed by claim 4 wherein the chloride of the selected metal is tungsten hexachloride.

11. A compound of complex chemical structure produced by the method claimed by claim 7.

12. A compound of complex chemical structure produced by the method comprising mixing substantially anhydrous trimethyl borate with a substantially anhydrous niobium pentachloride in a molar ratio of at least about 0.33 mole of said borate for each mole of niobium pentachloride in a substantially anhydrous inert diluent, permitting said pentachloride to react with said borate at a temperature between room temperature and about 120° C. until the reaction mixture ceases to give off methyl chloride thereby forming a liquor comprising said diluent and a compound of complex chemical structure comprising niobium, boron, carbon, hydrogen, chlorine, and oxygen.

13. A compound of complex chemical structure produced by the method comprising mixing substantially anhydrous trimethyl borate with a substantially anhydrous tantalum pentachloride in a molar ratio of at least about 0.33 mole of said borate for each mole of tantalum pentachloride in a substantially anhydrous inert diluent, permitting said pentachloride to react with said borate at a temperature between room temperature and about 120° C. until the reaction mixture ceases to give off methyl chloride thereby forming a liquor comprising said diluent and a compound of complex chemical structure comprising tantalum, boron, carbon, hydrogen, chlorine, and oxygen.

14. A compound of complex chemical structure prodhued by the method comprising mixing substantially anhydrous trimethyl borate with a substantially anhydrous tungsten pentachloride in a molar ratio of at least about 0.33 mole of said borate for each mole of tungsten pentachloride in a substantially anhydrous inert diluent, permitting said pentachloride to react with said borate at a temperature between room temperature and about 120° C. until the reaction mixture ceases to give off methyl chloride thereby forming a liquor comprising said diluent and a compound of complex chemical structure comprising tungsten, boron, carbon, hydrogen, chlorine, and oxygen.

References Cited
UNITED STATES PATENTS

| | | |
|---|---|---|
| 2,312,208 | 2/1943 | Clayton et al. ____ 260—429 XR |
| 2,346,155 | 4/1944 | Denison et al. ____ 260—429 XR |
| 2,440,750 | 5/1948 | Kraus et al. ____ 260—429.3 XR |
| 2,491,116 | 12/1949 | Kraus et al. ____ 260—429.3 XR |
| 2,541,851 | 2/1951 | Wright. |
| 2,597,920 | 5/1952 | Carroll _____ 260—429.5 XR |
| 2,941,981 | 6/1960 | Elbing et al. ____ 260—429.5 XR |
| 3,296,242 | 1/1967 | Turner et al. ___ 260—429.3 XR |

OTHER REFERENCES

Chemical Abstracts, vol. 32, p. 2511 (1938).
Chemical Abstracts, vol. 45, p. 14100 (1960).
Zhur. Obshcb. Khim., vol. 27, pp. 1476–79 (1957) (QD–1–Z6).
Chaiani et al., J. Chem. Soc., pp. 3167–70 (1960) (QD–1–C6).
Steinberg Organoboran Chemistry Intersc. Publ., John Wiley & Sons, Inc., New York (1964) vol. 1, pp. 144–46, p. 530 (copy in Gr. 112; QD–412.B1–S.8–C.7).

TOBIAS E. LEVOW, Primary Examiner

H. M. S. SNEED, Assistant Examiner

U.S. Cl. X.R.

106—2; 117—124, 135.5, 143; 260—91.7, 93.1, 93.5; 252—301.2, 431